US011140281B2

(12) United States Patent
Iwayama

(10) Patent No.: US 11,140,281 B2
(45) Date of Patent: Oct. 5, 2021

(54) METHOD OF TERMINAL APPARATUS THAT IS ABLE TO DISPLAY NOTIFICATION REGION

(71) Applicant: CANON KABUSHIKI KAISHA, Tokyo (JP)

(72) Inventor: Hiroyoshi Iwayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/817,076

(22) Filed: Mar. 12, 2020

(65) Prior Publication Data

US 2020/0304654 A1 Sep. 24, 2020

(30) Foreign Application Priority Data

Mar. 19, 2019 (JP) ............................ JP2019-051935

(51) Int. Cl.
*H04N 1/00* (2006.01)
*H04N 1/327* (2006.01)

(52) U.S. Cl.
CPC ..... *H04N 1/00307* (2013.01); *H04N 1/00464* (2013.01); *H04N 1/32745* (2013.01); *H04N 1/32776* (2013.01)

(58) Field of Classification Search
None
See application file for complete search history.

(56) References Cited

U.S. PATENT DOCUMENTS 9,652,802 B1 * 5/2017 Kasower ................ G06Q 40/00
2005/0248805 A1 * 11/2005 Shima ................ H04N 1/00244
358/1.15

FOREIGN PATENT DOCUMENTS

JP 2017-134628 A 8/2017

* cited by examiner

*Primary Examiner* — Thomas D Lee
(74) *Attorney, Agent, or Firm* — Canon U.S.A., Inc. IP Division

(57) ABSTRACT

A method of a terminal apparatus includes displaying, in a case where notification information is received in a state where a predetermined program is not operating in the foreground, a first notification region including a message that is based on message information included in the notification information, and not including information that is based on specific information included in the notification information, on a display unit in a state where the predetermined program is not operating in the foreground.

20 Claims, 9 Drawing Sheets

METHOD OF TERMINAL APPARATUS THAT IS ABLE TO DISPLAY NOTIFICATION REGION

BACKGROUND OF THE INVENTION

Field of the Invention

The aspect of the embodiments relates to a terminal apparatus and a method.

Description of the Related Art

There has been known a method in which a terminal apparatus such as a smartphone receives notification information for displaying information regarding a communication apparatus such as a printer, from the outside, and the terminal apparatus displays a notification screen based on the notification information. Japanese Patent Application Laid-Open No. 2017-134628 discusses a method in which a mobile terminal apparatus receives a push notification from a push notification distribution server and executes report processing of reporting the push notification.

On the other hand, as a configuration of performing notification that is based on notification information has become common, it is demanded to appropriately perform notification that is based on notification information.

SUMMARY OF THE INVENTION

According to an aspect of the embodiments, a method of a terminal apparatus includes receiving notification information including message information indicating a message to be notified to a user and specific information including a plurality of characters and symbols, displaying, in a case where the notification information is received in a state where a predetermined program included in the terminal apparatus is not operating in a foreground, a first notification region including a message that is based on the message information and not including information that is based on the specific information, on a display unit in a state where the predetermined program is not operating in the foreground, operating the predetermined program in the foreground in a case where a first operation is performed after the first notification region is displayed in a state where the predetermined program is not operating in the foreground, displaying a second notification region including a message that is based on the message information and information that is based on the specific information, on the display unit in a state where the predetermined program is operating in the foreground, and executing, in a case where a second operation is performed after the second notification region is displayed, processing that is based on the specific information.

Further features of the disclosure will become apparent from the following description of exemplary embodiments with reference to the attached drawings.

DESCRIPTION OF THE EMBODIMENTS

Figure 1:
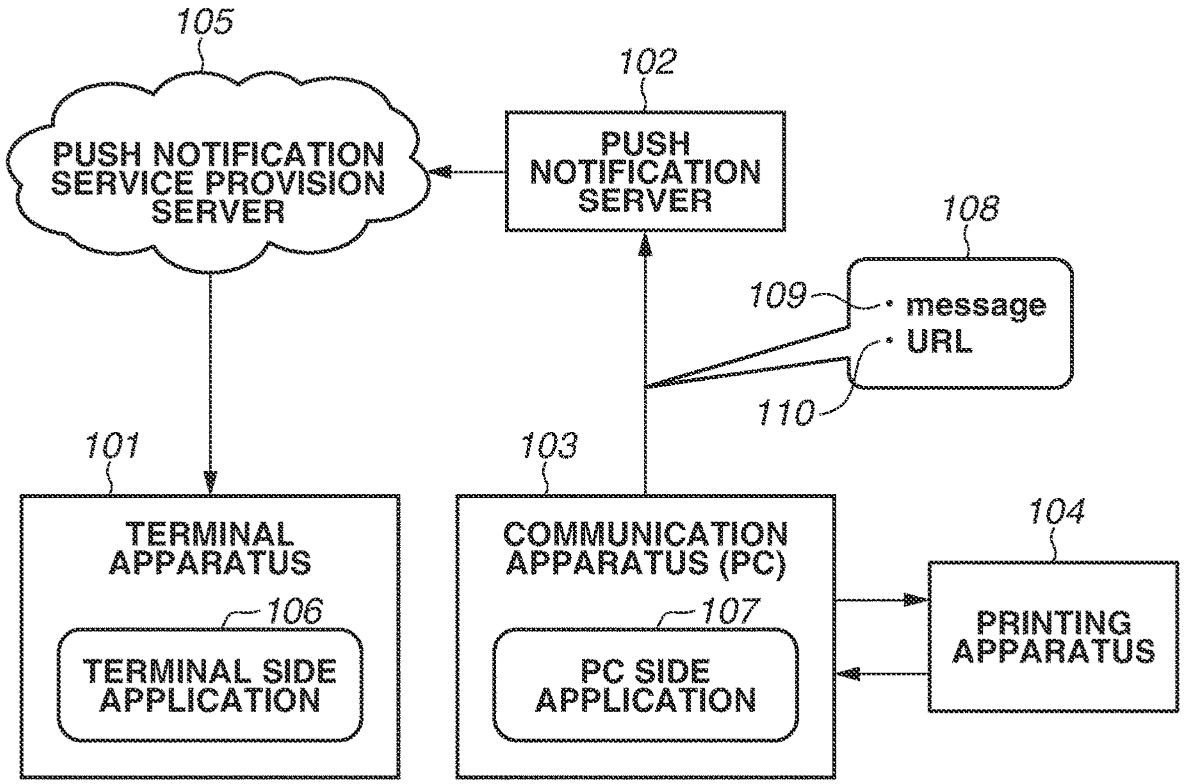
FIG. 1 is a diagram illustrating an example of a configuration of a communication system.

Hereinafter, exemplary embodiments of the disclosure will be described in detail with reference to the attached drawings. The following exemplary embodiments are not intended to limit the disclosure set forth in the appended claims, and not all the combinations of features described in the present exemplary embodiment are essential to the solution in the disclosure. The same components are assigned the same reference numerals and the redundant descriptions will be omitted.

Hereinafter, exemplary embodiments of the disclosure will be described in detail with reference to the drawings. The relative arrangement of components and display screens described in the present exemplary embodiment are not intended to limit the scope of the disclosure to those described in the present exemplary embodiment unless otherwise specified. In addition, the components may be changed without departing from the gist of the exemplary embodiment.

A terminal apparatus and a communication apparatus according to a first exemplary embodiment will be described. In the present exemplary embodiment, a smartphone is exemplified as a terminal apparatus. The smartphone refers to a multifunctional mobile phone equipped with a camera, a web browser, and an e-mail function in addition to functions of a mobile phone. In addition, a terminal apparatus to which the aspect of the embodiments is applicable is not limited to the smartphone, and the terminal apparatus may be any apparatus as long as the apparatus can communicate with the communication apparatus to be described below. For example, a digital camera, a mobile phone, a personal computer (PC), a tablet terminal, or a personal digital assistant (PDA) is applicable as a terminal apparatus. Although a PC is exemplified as a first communication apparatus in the present exemplary embodiment, the first communication apparatus is not limited to this. Various apparatuses are applicable as the first communication apparatus as long as the apparatuses can communicate with the terminal apparatus. For example, a printing apparatus or an apparatus that can provide a service other than printing such as a copying machine, a facsimile apparatus, a smartphone, a mobile terminal, a tablet terminal, a PDA, a digital camera, a music reproduction device, a storage, a projector, or a smart speaker is also applicable. As a second communication apparatus to be controlled by the first communication apparatus, a printing apparatus that performs large-format printing using an ink jet method is exemplified in the present exemplary embodiment, but the second communication apparatus is not limited to this. The second communication apparatus may be an apparatus other than the printing apparatus, or may be a printing apparatus that performs printing using a printing method (electrophotographic method, thermal transfer method, etc.) other than the ink jet method, for example.

<System Configuration>

First, a system configuration for implementing the present exemplary embodiment will be described. FIG. 1 is a diagram illustrating an example of a configuration of a communication system according to the present exemplary embodiment. The communication system includes a terminal apparatus 101, a push notification server 102, a PC 103, a printing apparatus 104, and a push notification service provision server (hereinafter, service provision server) 105.

The terminal apparatus 101 displays, on a display unit 608, information based on notification information transmitted from the service provision server 105. In addition, the terminal apparatus 101 includes a terminal side application 106. The terminal side application 106 has a function of analyzing notification information transmitted from the service provision server 105, notifying an analysis result to an operating system (OS), and thereby causing the OS to display a message that is based on the notification information. The terminal side application 106 also has a function of transmitting a print job to the printing apparatus 104 by wirelessly connecting with the printing apparatus 104, and causing the printing apparatus 104 to execute printing. The terminal apparatus 101 can communicate with the service provision server 105 via the Internet, and receives notification information via the Internet. In addition, the terminal apparatus 101 may communicate with the Internet via a mobile communication network such as 4 G or Long Term Evolution (LTE), or may communicate with the Internet via Wireless Fidelity (Wi-Fi)® connection with a wireless local area network (LAN) router (not illustrated).

The PC 103 includes a PC side application 107, and controls the printing apparatus 104 using the PC side application 107. Specifically, the PC 103 transmits a print job for executing printing to the printing apparatus 104 and receives a notification regarding the printing apparatus 104 from the printing apparatus 104. The notification regarding the printing apparatus 104 refers to, for example, a notification indicating that printing executed by the printing apparatus 104 based on a print job has been completed, or a notification indicating that an error has occurred in the printing apparatus 104. When the PC 103 receives the notification regarding the printing apparatus 104 from the printing apparatus 104, the PC 103 transmits a notification message 108 (message information) that is based on the notification, to the push notification server 102 to display information that is based on the notification on the terminal apparatus 101. In addition, the PC 103 may also display information that is based on the notification, on a display unit 508.

Information included in the notification message 108 may be data encrypted using a security key shared by the push notification server 102 and the PC side application 107. In addition, the information may be binary data, text data in a Unicode Transformation Format (UTF)-8, or data encoded by a method such as Base 64.

If the push notification server 102 receives the notification message 108 from the PC 103, the push notification server 102 transmits notification information created based on the notification message 108, to the terminal apparatus 101 via the service provision server 105. In the present exemplary embodiment, the description will be given assuming that the notification message 108 is included in notification information, but notification information transmitted to the terminal apparatus 101 and the notification message 108 transmitted to the push notification server 102 may be different in data format, for example. At this time, for displaying information on a plurality of apparatuses, the push notification server 102 may transmit notification information to a plurality of terminal apparatuses 101.

The service provision server 105 is a server that provides a push notification service. In the present exemplary embodiment, because an OS has a push notification function of displaying a notification region on a display unit by push notification, for using the function, a push notification service corresponding to each OS is used. In other words, the push notification server 102 transmits notification information to the terminal apparatus 101 via the service provision server 105 instead of directly transmitting notification information to the terminal apparatus 101. A push notification service to be used varies for each OS of the terminal apparatus 101 that receives a notification by push notification. In other words, the push notification server 102 transmits notification information to the terminal apparatus 101 via the service provision server 105 different for each OS of the terminal apparatus 101 that serves as a target of push notification. In addition, communication between the push notification server 102 and the terminal apparatus 101 is unidirectional communication in which active access can be performed only from the push notification server 102 side.

In the present exemplary embodiment, the push notification server 102 and the service provision server 105 each include one server, but the configuration is not limited to this configuration. A server system corresponding to the push notification server 102 or the service provision server 105 may be constructed by a plurality of servers operating in cooperation.

<Internal Configuration of Each Apparatus>

Figure 5:
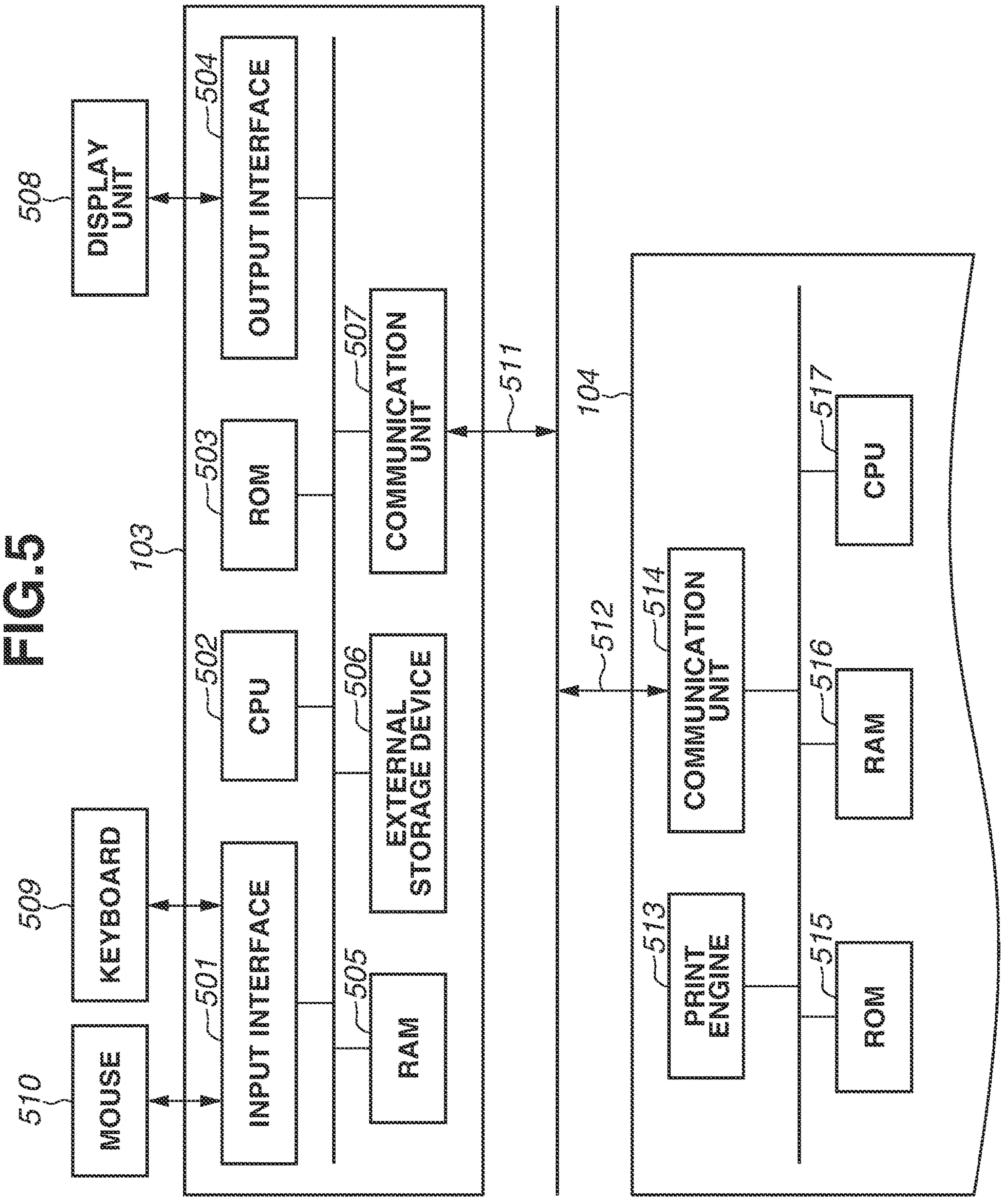
FIG. 5 is a diagram illustrating an example of configurations of a personal computer (PC) and a printing apparatus.

The configurations of the PC 103 and the printing apparatus 104 will be described with reference to block diagrams illustrated in FIG. 5.

The PC 103 includes an input interface 501, a central processing unit (CPU) 502, a read-only memory (ROM) 503, an output interface 504, a random access memory (RAM) 505, an external storage device 506, and a communication unit 507. The CPU 502 and the ROM 503 form a computer of the PC 103.

The input interface 501 is an interface for receiving a data input or an operation instruction from a user, by a mouse 510 or a keyboard 509 being operated.

The CPU 502 is a system control unit and controls the entire PC 103.

The ROM 503 stores fixed data such as a control program to be executed by the CPU 502, a data table, and an embedded OS program. In the present exemplary embodiment, each control program stored in the ROM 503 performs software execution control such as scheduling, task switching, or interrupt processing under the management of an embedded OS stored in the ROM 503.

The RAM 505 includes a static random access memory (SRAM) having a backup power source. Because the RAM 505 holds data using a primary battery for data backup (not illustrated), the RAM 505 can store important data such as a program control variable without volatilizing the data. The RAM 505 is also provided with a memory area for storing setting information of the PC 103 and management data of the PC 103. The RAM 505 is also used as a main memory and a work memory of the CPU 502.

The external storage device 506 stores programs such as the PC side application 107 for controlling the printing apparatus 104 connected via the communication unit 507 and for generating a print job interpretable by the printing apparatus 104, and various types of information to be used by the programs.

The output interface 504 is an interface for controlling the display unit 508 to display various types of data and a screen that is based on a notification received from the printing apparatus 104.

The display unit 508 includes a light-emitting diode (LED) or a liquid crystal display (LCD), and displays various types of data and a screen that is based on a notification received from the printing apparatus 104. In addition, an input from the user may be received via the display unit 508 by installing an operation unit such as a numerical entry key, a mode setting key, a determination key, a cancel key, and a power key on the display unit 508.

The communication unit 507 is component for connecting with another apparatus and executing data communication. For example, the communication unit 507 can be connected to an access point (not illustrated) in the printing apparatus 104. It becomes possible for the PC 103 and the printing apparatus 104 to communicate with each other by the communication unit 507 and the access point in the printing apparatus 104 being connected with each other. The communication unit 507 may directly communicate with the printing apparatus 104 by wireless communication, or may communicate with the printing apparatus 104 via an external device existing on the outside of the PC 103 and the printing apparatus 104. The external device includes an external access point existing on the outside of the PC 103 and the printing apparatus 104, and a device other than an access point that can relay communication. Examples of wireless communication methods include Wi-Fi®, Bluetooth® Low Energy, and Bluetooth® Classic. Examples of the external access point include a device such as a wireless LAN router. In addition, a communication method used by the communication unit 507 is not limited to a wireless communication method, and may be a wired communication method that uses a universal serial bus (USB) or a wired LAN.

The communication unit 507 can communicate the push notification server 102 via the Internet by using the Internet via an external device such as a wireless LAN router.

The PC 103 may include a plurality of communication units for communicating with another apparatus using different communication methods. In addition, a communication unit for the PC 103 and the printing apparatus 104 communicating with each other, and a communication unit for the PC 103 and the push notification server 102 communicating with each other may be different from each other.

The printing apparatus 104 includes a print engine 513, a communication unit 514, a ROM 515, a RAM 516, and a CPU 517. The CPU 517 and the ROM 515 form a computer of the printing apparatus 104.

The communication unit 514 is component for connecting with another apparatus and executing data communication. For example, the communication unit 514 includes an access point for connecting with an apparatus such as the PC 103, as an access point in the printing apparatus 104. The access point can connect to the communication unit 507 of the PC 103. In addition, the communication unit 514 may directly communicate with the PC 103 by wireless communication, or may communicate with the PC 103 via an external device. Examples of communication methods include Wi-Fi® and Bluetooth®. The communication unit 514 may include hardware functioning as an access point, or may operate as an access point using software for functioning as an access point. A communication method used by the communication unit 514 is not limited to a wireless communication method, and may be a wired communication method that uses a USB or a wired LAN.

The RAM 516 includes an SRAM having a backup power source. Because the RAM 516 holds data using a primary battery for data backup (not illustrated), the RAM 516 can store important data such as a program control variable without volatilizing the data. The RAM 516 is also provided with a memory area for storing setting information of the printing apparatus 104 and management data of the printing apparatus 104. The RAM 516 is also used as a main memory and a work memory of the CPU 517, and stores a receive buffer for temporarily storing printing information received from the PC 103, and various types of information.

The ROM 515 stores fixed data such as a control program to be executed by the CPU 517, a data table, and an OS program. In the present exemplary embodiment, each control program stored in the ROM 515 performs software execution control such as scheduling, task switching, or interrupt processing under the management of an embedded OS stored in the ROM 515.

The CPU 517 is a system control unit and controls the entire printing apparatus 104.

The print engine 513 forms an image onto a recording medium such as paper by adding recording material (ink) onto the recording medium, based on information stored in the RAM 516 and a print job received from the PC 103, and outputs a printed result.

The printing apparatus 104 may be equipped with a memory such as an external hard disk drive (HDD) or a secure digital (SD) card as an optional device, and information to be stored in the printing apparatus 104 may be stored in the memory.

Figure 6:
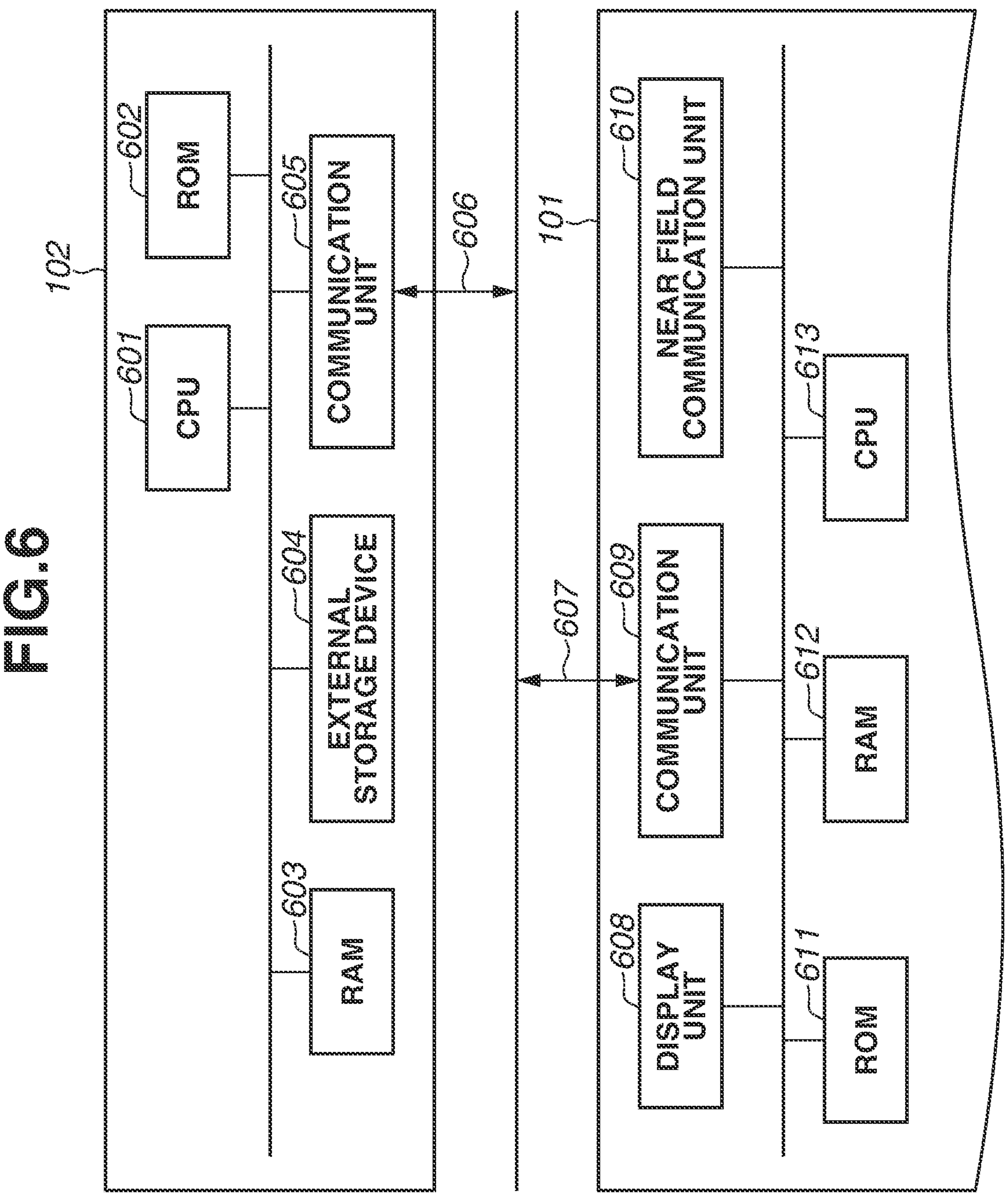
FIG. 6 is a diagram illustrating an example of configurations of a push notification server and the terminal apparatus.

The configurations of the push notification server 102 and the terminal apparatus 101 will be described with reference to block diagrams illustrated in FIG. 6.

The push notification server 102 includes a CPU 601, a ROM 602, a RAM 603, an external storage device 604, and a communication unit 605. The CPU 601 and the ROM 602 form a computer of the push notification server 102.

The CPU 601 is a system control unit and controls the entire push notification server 102.

The ROM 602 stores fixed data such as a control program to be executed by the CPU 601, a data table, and an OS program. In the present exemplary embodiment, each control program stored in the ROM 602 performs software execution control such as scheduling, task switching, or interrupt processing under the management of an embedded OS stored in the ROM 602.

The RAM 603 includes an SRAM having a backup power source. Because the RAM 603 holds data using a primary battery for data backup (not illustrated), the RAM 603 can store important data such as a program control variable without volatilizing the data. The RAM 603 is also provided with a memory area for storing setting information of the push notification server 102 and management data of the push notification server 102. The RAM 603 is also used as a main memory and a work memory of the CPU 601.

The external storage device 604 stores a program for performing push notification to the terminal apparatus 101 using the service provision server 105.

The communication unit 605 is component for connecting with another apparatus and executing data communication. The communication unit 605 can communicate, via the Internet, with the PC 103 and an external server providing the service provision server 105.

The push notification server 102 may include a plurality of communication units for communicating with another apparatus using different communication methods. In addition, a communication unit for the push notification server 102 to communicate with the PC 103 and a communication unit for the push notification server 102 to communicate with the external server providing the service provision server 105 may be different from each other.

The configuration of the service provision server 105 is a configuration similar to the configuration of the push notification server 102.

The terminal apparatus 101 includes the display unit 608, a communication unit 609, a near field communication unit 610, a ROM 611, a RAM 612, and a CPU 613. The CPU 613 and the ROM 611 form a computer of the terminal apparatus 101.

The CPU 613 is a system control unit and controls the entire terminal apparatus 101.

The ROM 611 stores fixed data such as a control program to be executed by the CPU 613, a data table, and an OS program. In the present exemplary embodiment, each control program stored in the ROM 611 performs software execution control such as scheduling, task switching, or interrupt processing under the management of an embedded OS stored in the ROM 611. Examples of the OS stored in the ROM 611 include an iOS provided by Apple Inc., and the Android provided by Google LLC. The ROM 611 also stores various programs such as the terminal side application 106 for analyzing received notification information and displaying a screen that is based on the notification information, and various types of information used by these programs.

The RAM 612 includes an SRAM having a backup power source. Because the RAM 612 holds data using a primary battery for data backup (not illustrated), the RAM 612 can store important data such as a program control variable without volatilizing the data. The RAM 612 is also provided with a memory area for storing setting information of the terminal apparatus 101 and management data of the terminal apparatus 101. The RAM 612 is also used as a main memory and a work memory of the CPU 613.

The display unit 608 includes an LED or an LCD, and displays various types of data and a screen that is based on notification information. In addition, an input from the user may be received via the display unit 608 by installing an operation unit such as a numerical entry key, a mode setting key, a determination key, a cancel key, and a power key on the display unit 608.

The communication unit 609 is component for connecting with another apparatus and executing data communication. For example, by connecting with an external device such as a wireless LAN router and using the Internet, the communication unit 609 receives information from the push notification server 102 and the PC 103 via the Internet. Examples of wireless communication methods used by the communication unit 609 include Wi-Fi (registered trademark), Bluetooth® Low Energy, and Bluetooth® Classic (registered trademark). In addition, a communication method used by the communication unit 609 is not limited to a wireless communication method, and may be a wired communication method that uses a USB or a wired LAN.

The near field communication unit 610 is a component for wirelessly connecting with another apparatus at a short distance. Examples of communication method include Bluetooth, and Wi-Fi Aware. In the present exemplary embodiment, the near field communication unit 610 can execute communication that uses Bluetooth® Low Energy or Bluetooth® Classic as a Bluetooth® function. In the present exemplary embodiment, the communication unit 609 is component that can perform higher-speed communication than the near field communication unit 610. In addition, a distance range in which communication can be performed by the communication unit 609 is longer than a distance range in which communication can be performed by the near field communication unit 610.

<Registration Processing for Push Notification>

For performing push notification to the terminal apparatus 101, registration processing for push notification is to be executed in advance. In addition, processing to be performed by the PC 103 in the registration processing to be described below is implemented by the CPU 502 executing the PC side application 107. In addition, processing to be performed by the terminal apparatus 101 in the registration processing to be described below is implemented by the CPU 613 executing the terminal side application 106.

First, by receiving a predetermined operation for generating a quick response (QR) Code®), from the user, the PC 103 displays the QR code on the display unit 508.

Next, the terminal apparatus 101 reads the QR code using a camera (not illustrated) included in the terminal apparatus 101. Then, by analyzing the read QR code, the terminal apparatus 101 acquires identification information of the PC side application 107 that has generated the QR code, and user information registered in the PC side application 107 that has generated the QR code.

Next, the terminal apparatus 101 transmits the identification information of the terminal apparatus 101 and the above-described information obtained by analyzing the QR code, to the push notification server 102 via the Internet as registration information (information transmission step). An address or a server name of the push notification server 102 that is to be used as a transmission destination address of registration information is prestored in the terminal side application 106. In one embodiment, the identification information of the terminal apparatus 101 includes, for example, a device token for receiving a push notification, and OS information (type of OS, version of OS, etc.) regarding an OS held by the terminal apparatus 101. The device token is information provided from an OS held by the terminal apparatus 101, and includes identification information of the terminal side application 106.

Information to be transmitted to the push notification server 102 needs not be acquired from the QR code. For example, the terminal apparatus 101 initially reads information displayed by the PC 103 in a text format, using the camera (not illustrated) included in the terminal apparatus 101. Then, by analyzing the read information by an Optical Character Recognition/Reader (OCR), the terminal apparatus 101 may extract information to be transmitted to the push notification server 102. In addition, for example, the terminal apparatus 101 may connect with the PC 103 using a wireless communication method or a wired communication method, and acquire information to be transmitted to the push notification server 102, via the connection.

The push notification server 102 thereby recognizes a transmission destination terminal apparatus 101 of notification information that is based on a notification message received from each PC side application 107. The registration processing is completed in this manner.

In the present exemplary embodiment, the description has been given of a configuration in which identification information of the PC side application 107 and identification information of the terminal apparatus 101 are associated with each other and managed by the push notification server 102, but the configuration is not limited to this. For example, identification information of the PC 103 that displays a QR code may be acquired based on the QR code. Then, identification information of the PC 103 and identification information of the terminal apparatus 101 may be associated with each other and managed by the push notification server 102. In this case, the push notification server 102 recognizes a transmission destination terminal apparatus 101 of notification information that is based on a notification message received from each PC 103. Alternatively, for example, by reading a QR code, the terminal apparatus 101 may acquire identification information of the printing apparatus 104 controlled by the PC side application 107. Then, identification information of the printing apparatus 104 and identification information of the terminal apparatus 101 may be associated with each other and managed by the push notification server 102. In this case, the push notification server 102 recognizes a transmission destination terminal apparatus 101 of notification information that is based on a notification message regarding each printing apparatus 104.

Alternatively, the registration processing may be executed by the following method, for example. First, the terminal apparatus 101 connects with the PC 103 using a wireless communication method or a wired communication method, and transmits identification information of the terminal apparatus 101 to the PC 103 via the connection. The PC 103 transmits identification information of the PC side application 107 and the identification information of the terminal apparatus 101 to the push notification server 102 via the Internet as registration information. In this manner, the registration processing is completed also by the identification information of the PC side application 107 and the identification information of the terminal apparatus 101 being associated with each other and managed by the push notification server 102. In the registration processing, identification information of the PC 103 and identification information of the terminal apparatus 101 may be associated with each other and managed by the push notification server 102, as well. Alternatively, identification information of the printing apparatus 104 and identification information of the terminal apparatus 101 may be associated with each other and managed by the push notification server 102.

In addition, a transmission method of registration information in the registration processing is not specifically limited. For example, the transmission method may be a hypertext transfer protocol (HTTP) method of converting registration information into an HTML format, and transmitting the converted registration information, or may be a file transfer protocol (FTP) method of creating registration information in a file format and transmitting the file.

The registration information may be data encrypted using a security key shared by the push notification server 102 and the terminal side application 106. In addition, the registration information may be binary data, text data in a UTF-8, or data encoded by a method such as Base 64.

<Push Notification>

The push notification is a notification method of performing notification to the terminal apparatus 101 using a push notification service.

Figure 3:
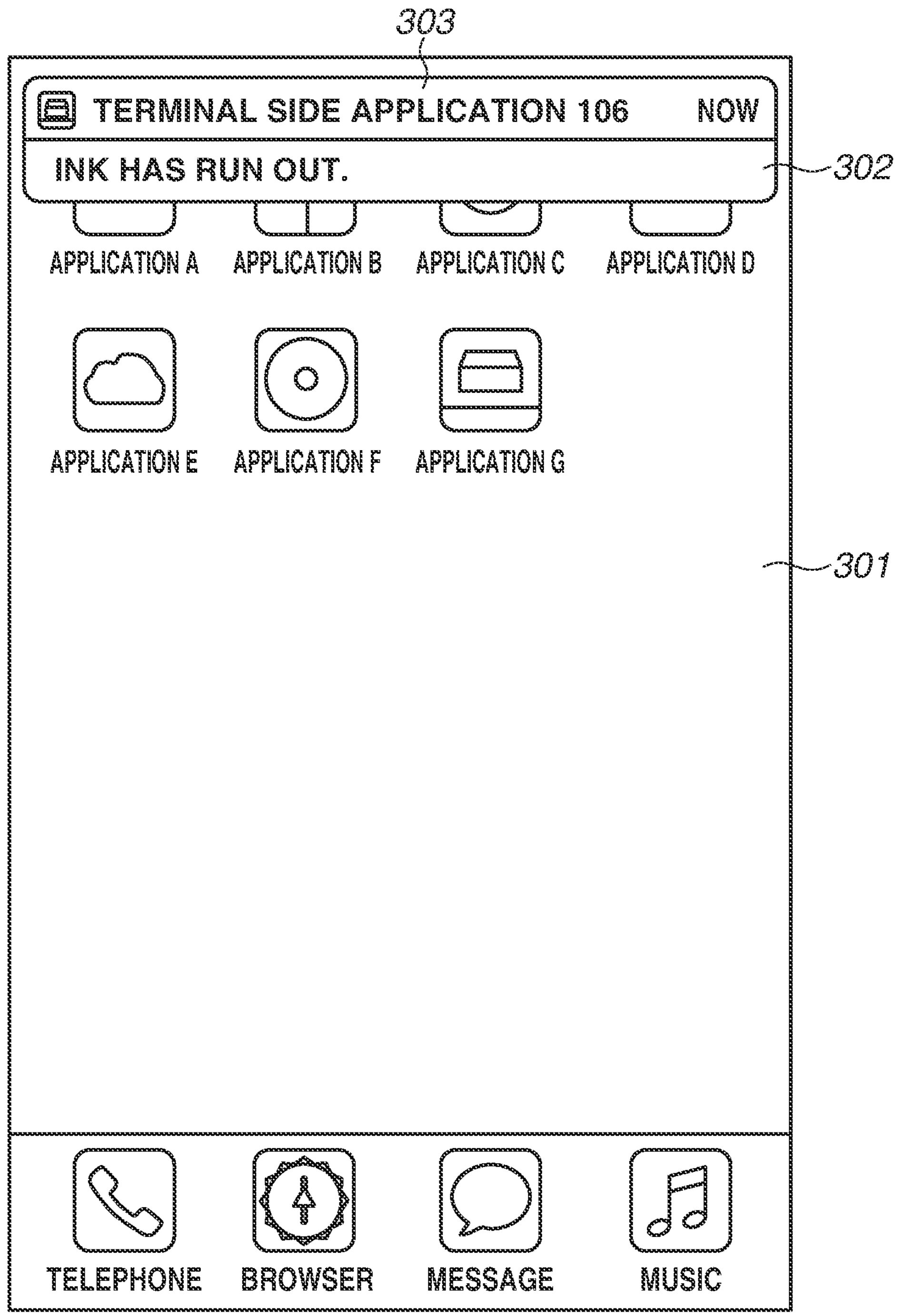
FIG. 3 illustrates an example of a screen in a state where a notification region is displayed by a push notification function.

In the present exemplary embodiment, the PC 103 transmits information regarding the printing apparatus 104 to the push notification server 102 as the notification message 108. Then, the push notification server 102 transmits notification information that is based on the notification message 108 and that is for displaying a message included in the notification message 108, to the terminal apparatus 101 via the service provision server 105. The push notification server 102 thereby notifies the information regarding the printing apparatus 104 to the terminal apparatus 101. If the terminal apparatus 101 receives the notification information, the terminal apparatus 101 newly displays, on a screen displayed by the display unit 608, a notification region for notifying a message that corresponds to the notification information and that is included in the notification message 108. FIG. 3 illustrates an example of a screen in a state where a notification region is displayed by the push notification function. A top screen 301 indicates the largest region displayable by the display unit 608, and a notification region 302 indicates a region for notifying a message included in the notification message 108. In addition, a region 303 indicates an icon indicating an application to which the displayed notification region 302 corresponds, and information regarding a name of the application to which the displayed notification region 302 corresponds. In the present exemplary embodiment, an application corresponding to the notification region 302 displayed based on notification executed by the PC 103 using the PC side application 107 is the terminal side application 106.

In the present exemplary embodiment, the push notification function of displaying the notification region 302 on the display unit by push notification is implemented by an OS included in the terminal apparatus 101. The push notification function is a function that can transmit a notification to the terminal side application 106 even in a state where the terminal side application 106 is not activated on the terminal apparatus 101. In other words, by the push notification function, the terminal apparatus 101 can display the notification region 302 even in a state where the terminal side application 106 is operating in the background, in a state where the terminal side application 106 is not activated, or in a state where a home screen is displayed.

In the present exemplary embodiment, the notification message 108 can include a message 109 and a uniform resource locator (URL) 110. The message 109 indicates content of a message to be displayed in the notification region 302. Specifically, for example, the message 109 is a message (error notification message) for notifying an error that has occurred in the printing apparatus 104, or a message for notifying the progress of printing processing or scan processing executed in the printing apparatus 104. Examples of errors that occur in the printing apparatus 104 include an ink low error in which an amount of ink held by the printing apparatus 104 becomes a predetermined amount or less, a no paper error in which an amount of paper held by the printing apparatus 104 becomes a predetermined amount or less, and a paper jam error in which paper held by the printing apparatus 104 has jammed in a conveyance path. The URL 110 indicates an address of a predetermined resource, is information for using the predetermined resource, and includes a plurality of arrayed symbols and alphabets. Specifically, for example, the URL 110 indicates an address of a web page on the Internet, and is information for displaying the web page. More specifically, for example, if the message 109 is an error notification message, the URL 110 is a URL for displaying a web page describing detailed information and a solving method of an error that has occurred in the printing apparatus 104. In addition, for example, if the message 109 is an error notification message indicating the ink low error or the no paper error, the URL 110 is a URL for displaying a web page for purchasing ink or paper. In addition, if sufficient content is notified to the user by the message 109, the URL 110 needs not be included in the notification message 108. For example, if the message 109 is a message indicating that printing processing has been completed in the printing apparatus 104, the URL 110 needs not be included in the notification message 108. In addition, the URL 110 needs not be a URL for displaying a web page. For example, the URL 110 may be a URL that indicates an address of a predetermined application installed on the terminal apparatus 101, and starts the predetermined application. Alternatively, for example, the URL 110 may be a URL that indicates an address of a store application for installing a predetermined application onto the terminal apparatus 101, and starts the store application. Specifically, for example, if the message 109 is a message indicating that printing processing has been completed in the printing apparatus 104, the URL 110 may be a URL for starting a different printing application other than the terminal side application 106. At this time, a message prompting the use of the different printing application may be displayed.

A URL generally includes a long character string. In addition, the notification region 302 has a limitation on the number of displayable characters. Thus, in a configuration in which a URL is displayed in the notification region 302, the number of characters to be displayed based on the notification message 108 becomes larger, and a part of characters that are based on the notification message 108 (e.g., characters indicated by the message 109) can possibly fail to be displayed. It is difficult for the user to recognize information indicated by a URL in the first place, even if a URL itself is displayed in the notification region 302. For such reasons, there is a situation of low usability in a configuration in which a URL is displayed in the notification region 302.

In view of the foregoing, in the present exemplary embodiment, even if the URL 110 is included in the notification message 108, a character string corresponding to the URL 110 is not displayed in the notification region 302. Then, after the notification region 302 is displayed, a link button corresponding to the URL 110 is displayed on a screen displayed by the terminal side application 106. If the link button is pressed by the user, processing corresponding to the URL 110 is executed.

With this configuration, it is possible to make processing that is based on the URL 110 executable, and enhance the visibility of the notification region 302.

<Notification Performed by Terminal Side Application 106>

Figure 4A:
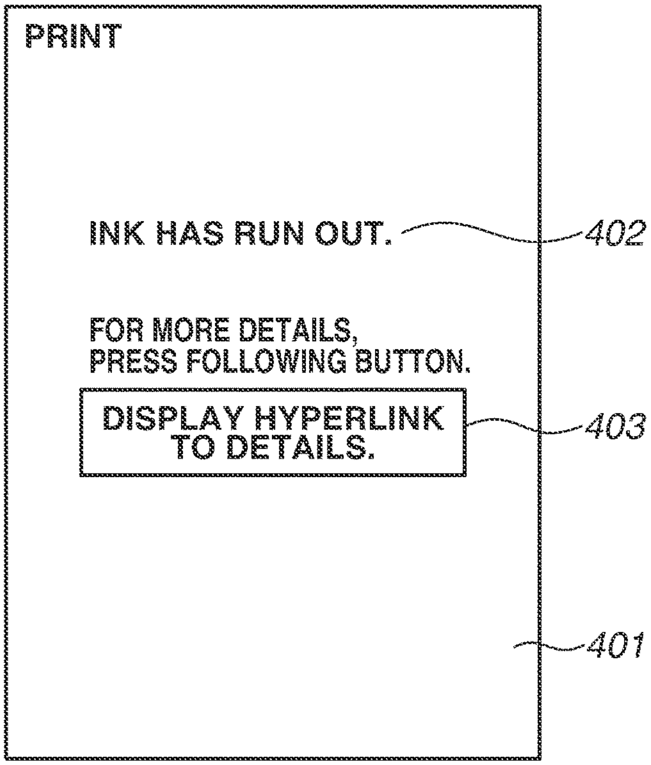
FIGS. 4A and 4B each illustrate an example of a screen in a state where a notification screen is displayed by a terminal side application.

In the present exemplary embodiment, if a user operation is performed on the notification region 302 displayed by push notification, more detailed information is notified by a screen displayed in a state where the terminal side application 106 is operating in the foreground. In other words, in the present exemplary embodiment, based on notification information, notification by the push notification function and notification by a function other than the push notification function are performed. FIG. 4A illustrates an example of a notification screen 401 displayed by the terminal side application 106. A notification region 402 indicates a notification region for notifying content that is based on the message 109, and a link button 403 indicates a button for executing processing that is based on the URL 110. If the link button 403 is operated by the user, processing that is based on the URL 110 (e.g., display of a web page that is based on the URL 110, activation of an application that is based on the URL 110) is executed. With this configuration, more detailed information can be notified to the user interested in the notification region 302 displayed by push notification.

Figure 4B:

In the present exemplary embodiment, the terminal side application 106 displays the URL 110 as a button instead of displaying the URL 110 as a character string. With this configuration, the visibility of the notification screen 401 displayed by the terminal side application 106 can be enhanced. Alternatively, as illustrated in FIG. 4B, the URL 110 may be displayed as a character string and a user operation on the character string may be receivable. If the URL 110 is not included in the notification message 108, the link button 403 and a character string of the URL 110 are not displayed on the notification screen 401, and only content that is based on the message 109 is displayed on the notification screen 401. In addition, a character string displayed on the link button 403 may be predefined by the terminal side application 106, or may be a part of the character string of the URL 110. In other words, in the present exemplary embodiment, at least a part of a plurality of characters and symbols included in the URL 110 is omitted on the notification screen 401.

<List of Notification Performed by Terminal Side Application 106>

Figure 7:
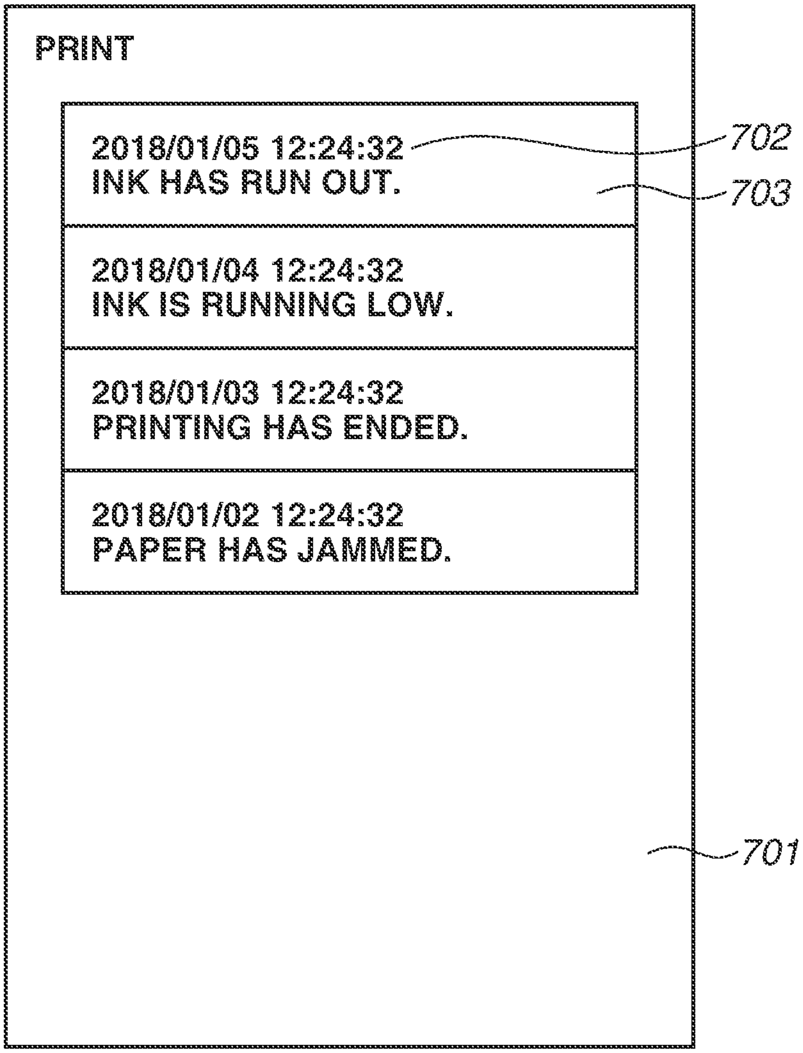
FIG. 7 illustrates an example of a notification list screen displayed by the terminal side application.

In the present exemplary embodiment, if a predetermined operation is performed on a screen displayed by the terminal side application 106, the terminal side application 106 displays a list of notification information received by push notification, in the foreground. FIG. 7 illustrates an example of a notification list screen 701 displayed by the terminal side application 106. A notification time 702 indicates information regarding time and date on which notification information is received, and a notification region 703 indicates a notification region for notifying content that is based on the message 109. The user can thereby easily recognize what type of push notification is performed and when the push notification is performed. Also on the notification list screen 701, similarly to the notification region 302, a character string corresponding to the URL 110 is not displayed even if the URL 110 is included in the notification message 108. This can enhance the visibility of the notification list screen 701.

If any of notification regions 703 is operated by the user, the notification screen 401 that is based on the notification message 108 corresponding to the operated notification region 703 among the plurality of notification regions 703 included in the notification list screen 701 is displayed. At this time, if the URL 110 is included in the notification message 108 corresponding to the operated notification region 703, the link button 403 corresponding to the URL 110 is displayed on the notification screen 401. With this configuration, the details of an arbitrary notification can be presented to the user.

<Flowchart Illustrating Control in Present Exemplary Embodiment>

Figure 2:
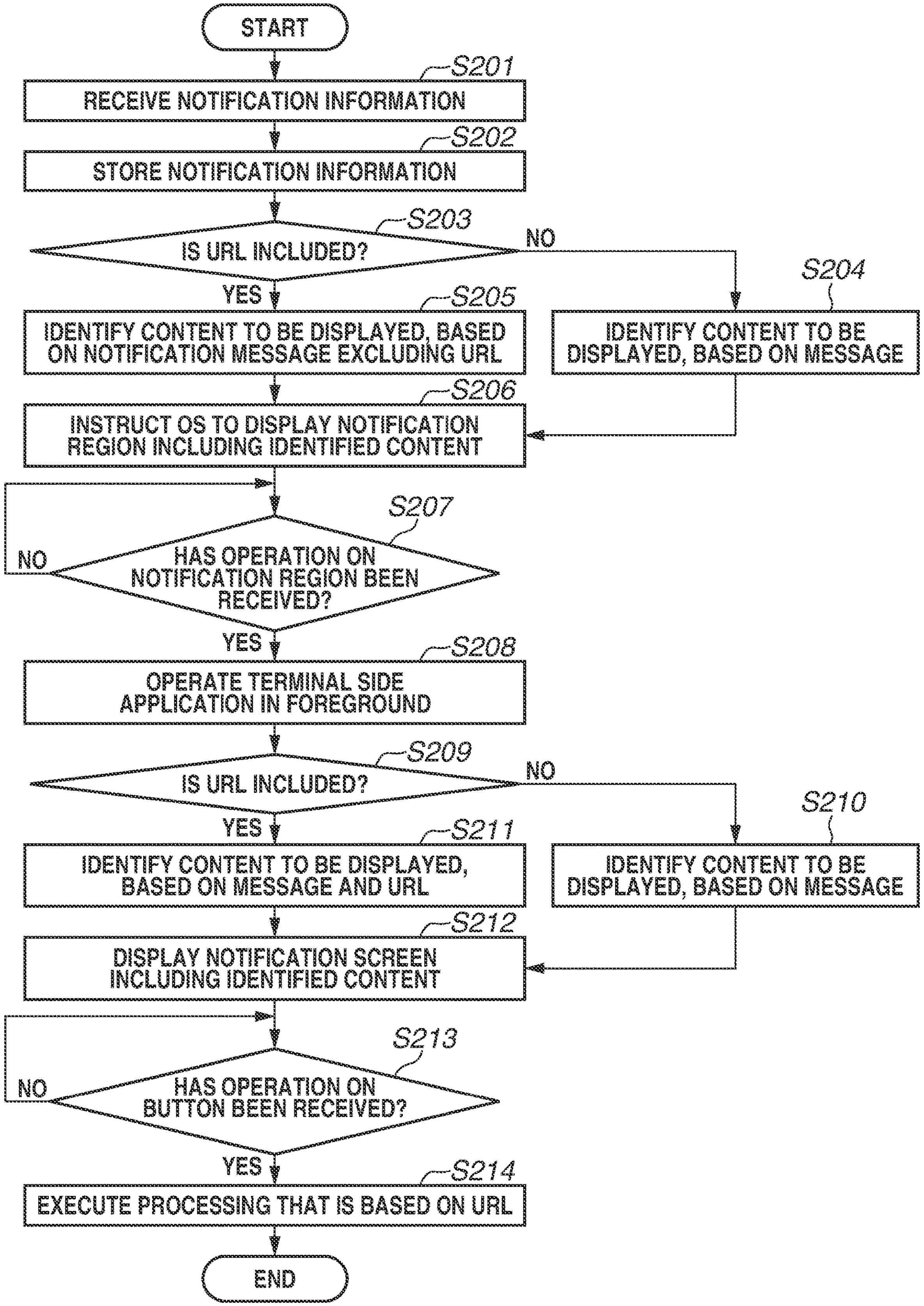
FIG. 2 is a flowchart illustrating processing executed by a terminal apparatus.

FIG. 2 is a flowchart illustrating processing executed by the terminal apparatus 101 in the present exemplary embodiment. The processing illustrated in this flowchart is implemented by the CPU 613 loading the terminal side application 106 stored in the ROM 611, onto the RAM 612, and executing the terminal side application 106, for example. In addition, the processing illustrated in this flowchart is started when notification information is received by the terminal apparatus 101 in a state where the terminal side application 106 is not operating in the foreground. The state where the terminal side application 106 is not operating in the foreground is, for example, a state where the terminal side application 106 is operating in the background, or a state where the terminal side application 106 is not operating on the terminal apparatus 101.

If notification information is received by the terminal apparatus 101 via the service provision server 105, first, the CPU 613 analyzes the notification information using the OS of the terminal apparatus 101. Because the notification information includes information regarding an application corresponding to the notification information, the CPU 613 identifies an application to which the received notification information corresponds. In the present exemplary embodiment, because the notification information corresponds to the terminal side application 106, the CPU 613 transmits the notification information to the terminal side application 106.

Thus, first, in step S201, the CPU 613 receives notification information by the terminal side application 106, and starts analysis of the notification information.

Next, in step S202, the CPU 613 stores the notification information and information related to the notification information into a predetermined region in a memory included in the terminal apparatus 101. The information related to the notification information is information regarding time and date on which the notification information is received, for example. In addition, the notification list screen 701 is displayed based on the information stored at the time.

Next, in step S203, the CPU 613 determines whether the URL 110 is included in the notification message 108. More specifically, the CPU 613 determines whether data starting from a specific character string indicating a URL exists in the notification message 108. The specific character string is a character string such as "http://", "https://", "market://", or "mail://". If it is determined that the URL 110 is included in the notification message 108 (YES in step S203), the CPU 613 advances the processing to step S205. In step S205, the CPU 613 identifies content to be displayed in the notification region 302, based on a portion of the notification message 108 that excludes the URL 110 (i.e., the message 109). If it is determined that the URL 110 is not included in the notification message 108 (NO in step S203), the CPU 613 advances the processing to step S204. In step S204, the CPU 613 identifies content to be displayed in the notification region 302, based on the notification message 108 (i.e., the message 109). As a result, in the present exemplary embodiment, the CPU 613 identifies content in such a manner that content that is based on the URL 110 is not displayed in the notification region 302, and content that is based on the message 109 is displayed in the notification region 302. After the processing in step S204 or S205, the CPU 613 advances the processing to step S206.

Next, in step S206, the CPU 613 notifies the OS of the terminal apparatus 101 that the notification region 302 including the content (content that is based on the message 109) identified in step S204 or S205 is to be newly displayed on the display unit 608 by the push notification function. The notification region 302 including the content that is based on the message 109 is thereby newly displayed on the display unit 608 as illustrated in FIG. 3, for example. If the notification information is received in a state where the terminal side application 106 is not operating in the foreground, the notification region 302 is newly displayed on the display unit 608 in a state where the terminal side application 106 is not operating in the foreground.

Next, in step S207, the CPU 613 determines whether a user operation on the notification region 302 has been received. If it is determined that a user operation has been received (YES in step S207), the CPU 613 advances the processing to step S208. If it is determined that a user operation has not been received (NO in step S207), the CPU 613 performs the processing in step S207 again and waits for the reception of a user operation. The CPU 613 may end the processing if a user operation has not been received for a certain period of time or more.

In step S208, the CPU 613 activates the terminal side application 106 and operates the terminal side application 106 in the foreground.

Next, in step S209, the CPU 613 determines whether the URL 110 is included in the notification message 108. The details of the processing is similar to the processing in step S203. If it is determined that the URL 110 is included in the notification message 108 (YES in step S209), the CPU 613 advances the processing to step S211. In step S211, the CPU 613 identifies content in such a manner that the notification screen 401 including the notification region 402 that is based on the message 109 and the link button 403 that is based on the URL 110 is displayed. On the other hand, if it is determined that the URL 110 is not included in the notification message 108 (NO in step S209), the CPU 613 advances the processing to step S210. In step S210, the CPU 613 identifies content in such a manner that the notification screen 401 including the notification region 402 that is based on the message 109 and not including the link button 403 that is based on the URL 110 is displayed. In other words, in the present exemplary embodiment, on a screen displayed while the terminal side application 106 is operating in the foreground, the CPU 613 can display content that is based on the URL 110. After the processing in step S210 or S211, the CPU 613 advances the processing to step S212.

In step S212, on the screen displayed while the terminal side application 106 is operating in the foreground, the CPU 613 newly displays the notification screen 401 including the content identified in step S210 or S211, on the display unit 608.

Next, in step S213, the CPU 613 determines whether a user operation on the link button 403 has been received. If it is determined that a user operation has been received (YES in step S213), the CPU 613 advances the processing to step S214. If it is determined that a user operation has not been received (NO in step S213), the CPU 613 performs the processing in step S213 again and waits for the reception of a user operation. In addition, if the notification screen 401 not including the link button 403 is displayed in step S213, processing in step S213 and a subsequent step is not executed.

In step S214, the CPU 613 executes processing that is based on the URL 110 corresponding to the link button 403. As described above, the processing that is based on the URL 110 is, for example, the display of a web page that is based on the URL 110, or the activation of an application program that is based on the URL 110.

With this configuration, it is possible to enhance the visibility of the notification region 302 while making processing that is based on the URL 110 executable.

A notification system in a second exemplary embodiment is similar to the notification system in the first exemplary embodiment unless otherwise noted.

For example, the notification system of the present exemplary embodiment is also applicable to a configuration in which a plurality of users communally uses the printing apparatus 104. In such a configuration, for example, an administrative user bears a role in solving an error of the printing apparatus 104, and a user other than the administrative user does not bear a role in solving an error of the printing apparatus 104 in some cases. In such cases, a user other than the administrative user needs not receive several notifications (e.g., notification regarding an error that has occurred in the printing apparatus 104), among a plurality of types of notifications regarding the printing apparatus 104. Thus, in the present exemplary embodiment, a configuration in which content to be notified to the user is controlled more precisely will be described.

Figure 8:
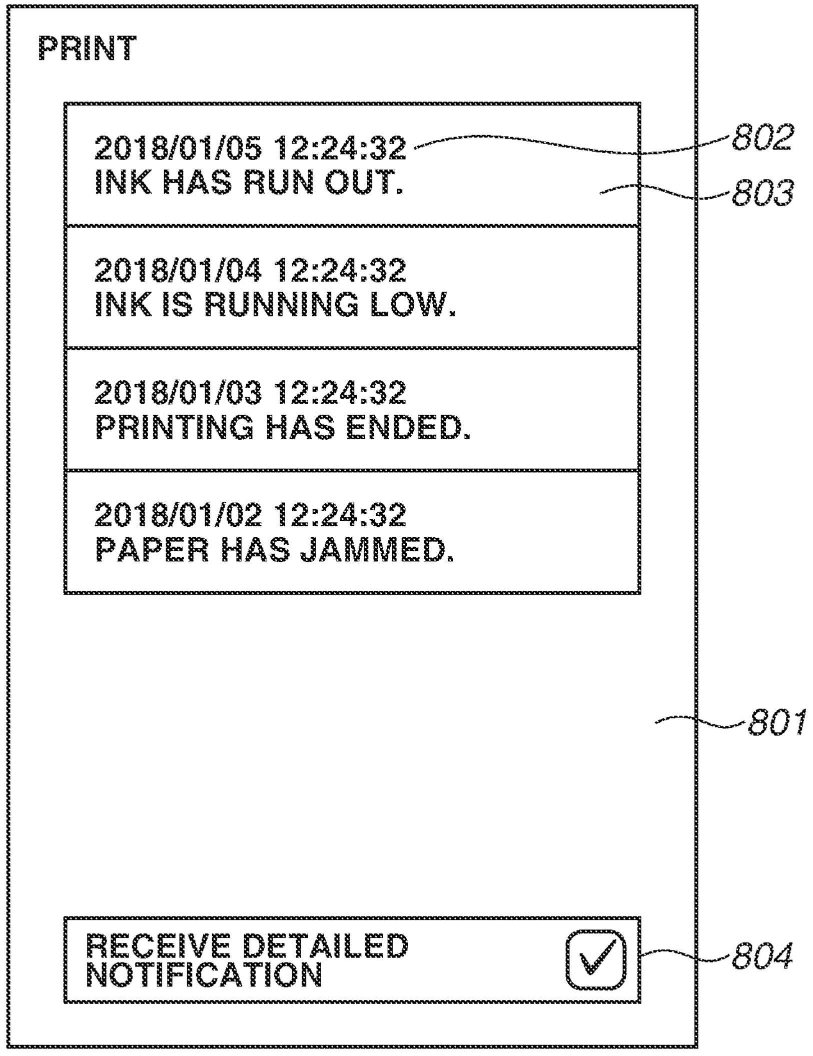
FIG. 8 illustrates an example of a notification list screen displayed by a terminal side application.

Also in the present exemplary embodiment, similarly to the first exemplary embodiment, if a predetermined operation is performed on a screen displayed by the terminal side application 106, the terminal side application 106 displays a list of notification information received by push notification. FIG. 8 illustrates an example of a notification list screen 801 displayed by the terminal side application 106 in the present exemplary embodiment. A notification time 802 indicates information regarding time and date on which notification information is received, and a notification region 803 indicates a notification region for notifying content that is based on the message 109. A checkbox 804 is an operation region for controlling a notification to be presented to the user.

If an operation of ticking the checkbox 804 is performed, the terminal side application 106 identifies a notification in such a manner that all types of notifications of a plurality of types of notifications regarding the printing apparatus 104 are presented to the user. On the other hand, if an operation of unchecking the checkbox 804 is performed, the terminal side application 106 identifies a notification in such a manner that a predetermined notification among the plurality of types of notifications regarding the printing apparatus 104 is not presented to the user, and a notification other than the predetermined notification is presented to the user. As described above, the predetermined notification is a notification regarding an error that has occurred in the printing apparatus 104, for example, and the notification other than the predetermined notification is a notification regarding the progress of printing processing or scan processing executed in the printing apparatus 104, for example.

With this configuration, an administrative user can receive all notifications and appropriately manage the printing apparatus 104 by ticking the checkbox 804. On the other hand, a user other than the administrative user can receive only a notification related to itself (e.g. notification regarding the progress of printing processing instructed by itself), by not ticking the checkbox 804.

The configuration in which the checkbox 804 is displayed on the notification list screen 801 has been described, but the configuration is not limited to this configuration. The checkbox 804 is to be displayed on a screen displayed while the terminal side application 106 is operating in the foreground.

Figure 9:
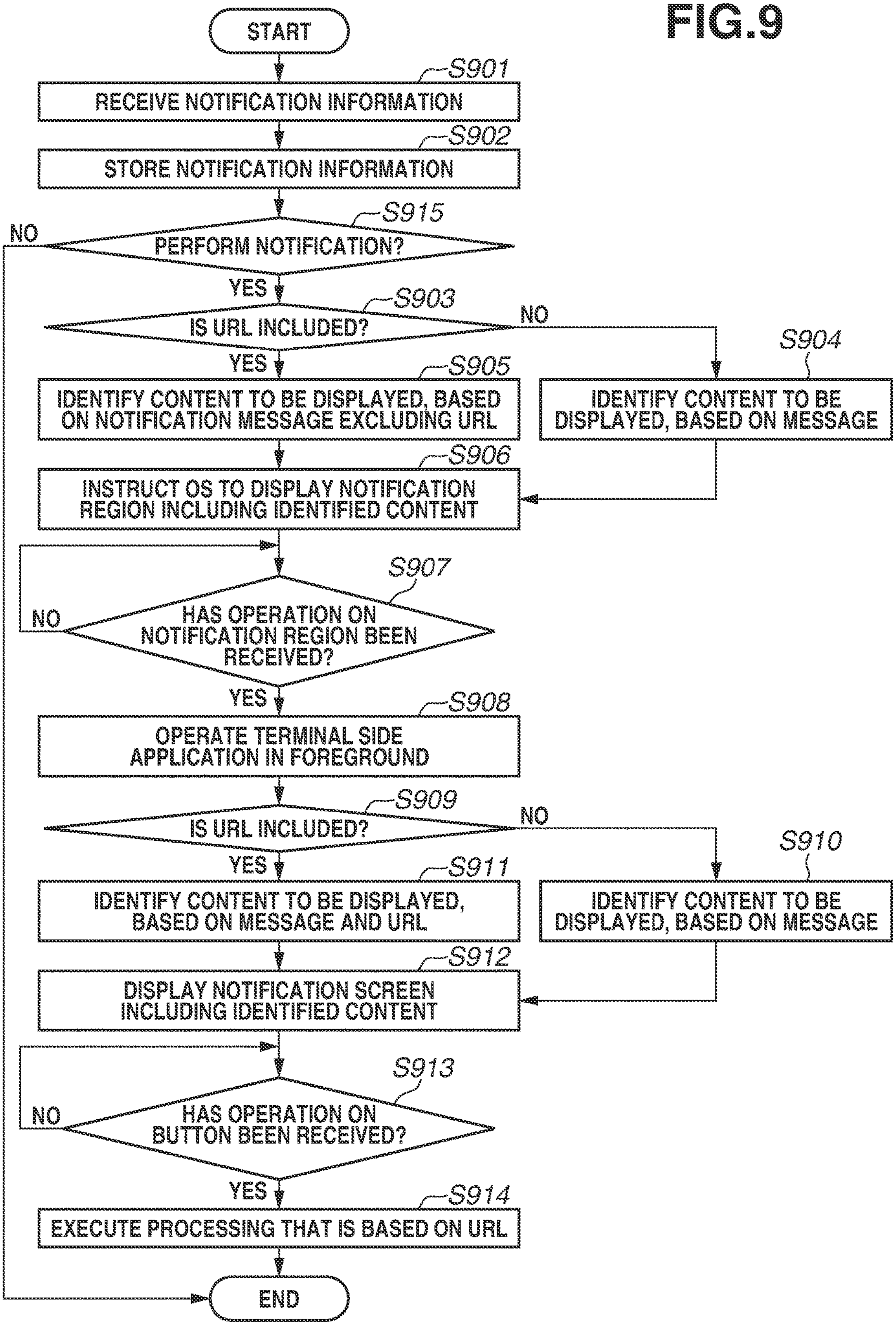
FIG. 9 is a flowchart illustrating processing executed by a terminal apparatus.

FIG. 9 is a flowchart illustrating processing executed by the terminal apparatus 101 in the present exemplary embodiment. The processing illustrated in this flowchart is implemented by the CPU 613 loading the terminal side application 106 stored in the ROM 611, onto the RAM 612, and executing the terminal side application 106, for example. In addition, the processing illustrated in this flowchart is started when notification information is received by the terminal apparatus 101 in a state where the terminal side application 106 is not operating in the foreground.

Because the processing in steps S901 to S914 is similar to the processing in steps S201 to S214, the description will be omitted.

In step S915, the CPU 613 determines whether to perform notification that is based on the notification information received in step S901. Specifically, first, the CPU 613 determines whether the checkbox 804 is ticked. If it is determined that the checkbox 804 is ticked, the CPU 613 determines to perform notification that is based on the notification information received in step S901. On the other hand, if it is determined that the checkbox 804 is not ticked, the CPU 613 identifies content of a notification that is based on the notification information received in step S901. The notification information includes a notification ID corresponding to content of a notification, for example. If content corresponding to the notification ID included in the notification information is content corresponding to the above-described predetermined notification, the CPU 613 determines not to perform notification that is based on the notification information received in step S901. On the other hand, if content corresponding to the notification ID included in the notification information is content corresponding to a notification other than the above-described predetermined notification, the CPU 613 determines to perform notification that is based on the notification information received in step S901. Then, if the CPU 613 determines to perform notification that is based on the notification information received in step S901 (YES in step S915), the notification is performed in processing in step S903 and subsequent steps. If the CPU 613 determines not to perform notification that is based on the notification information received in step S901 (NO in step S915), the processing ends without performing the notification.

With this configuration, it becomes possible to perform notification processing suitable for each user.

Even if the checkbox 804 is ticked, all pieces of received notification information are displayed on the notification list screen 801. The user can thereby recognize all the pieces of received notification information if the user desired to check notification information in detail. The configuration is not limited to this configuration, and if the checkbox 804 is not ticked, control may be performed in such a manner that notification information including content corresponding to the predetermined notification is not displayed on the notification list screen 801, and notification information including content corresponding to a notification other than the predetermined notification is displayed on the notification list screen 801. In this configuration, notification information needs not be stored in step S902.

Other Exemplary Embodiments

The above description has been given of the configuration of notifying information regarding the printing apparatus 104 by the PC 103 transmitting the notification message 108, but the configuration is not limited to this configuration. For example, information regarding the printing apparatus 104 may be notified by the printing apparatus 104 generating the notification message 108 on its own and transmitting the notification message 108 to the push notification server 102 not via the PC 103.

The above description has been given of the configuration in which notification is performed to the terminal apparatus 101 by push notification. Nevertheless, notification may be performed to the terminal apparatus 101 by a pull notification method of transmitting notification information to the terminal apparatus 101 based on a request from the terminal apparatus 101, for example.

The above description has been given of the configuration of performing notification in the communication system illustrated in FIG. 1, but the configuration is not limited to this configuration. For example, the push notification server 102 needs not be included in the communication system. In this case, first, the PC 103 manages identification information of the PC side application 107 and identification information of the terminal apparatus 101 in association with each other by the registration processing. The registration processing is implemented by the terminal apparatus 101 connecting with the PC 103 using a wireless communication method or a wired communication method, and transmitting identification information of the terminal apparatus 101 to the PC 103 via the connection, for example. Then, if a notification is received from the printing apparatus 104, similarly to the push notification server 102 in the above-described exemplary embodiments, the PC 103 generates notification information that is based on the notification message 108. Then, the PC 103 transmits the notification information to the terminal apparatus 101 managed by the registration processing, via the service provision server 105.

The above description has been given of the configuration in which information regarding a second communication apparatus (printing apparatus) is notified using the notification message 108, but the configuration is not limited to this configuration. For example, information other than the information regarding the second communication apparatus such as information regarding a sale in a predetermined shop may be notified using the notification message 108.

The above description has been given of the configuration in which the URL 110 is included in the notification message 108 and display regarding the URL 110 is controlled, but the configuration is not limited to this configuration. For example, position information obtained by a global positioning system (GPS) may be included in the notification message 108 in place of the URL 110. Specifically, for example, if the message 109 is information for notifying sale information of a predetermined shop, position information of the predetermined shop may be included in the notification message 108. In this configuration, for example, in a case where the notification region 302 including content that is based on the message 109 and not including content that is based on the position information is selected by the user, an application related to the predetermined shop is activated. Then, the link button 403 that is based on the position information is displayed on the notification screen 401 on the application related to the predetermined shop. If the link button 403 is operated, the position of the predetermined shop that is based on the position information is indicated by the application related to the predetermined shop or a map application.

An exemplary embodiment of the disclosure can also be implemented by processing of supplying a program for implementing one or more functions of the above-described exemplary embodiments, to a system or an apparatus via a network or a storage medium, and reading and executing the program by one or more processors in a computer of the system or the apparatus. In addition, an exemplary embodiment of the disclosure can also be implemented by a circuit (e.g., application specific integrated circuit (ASIC)) that implements one or more functions.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-051935, filed Mar. 19, 2019, which is hereby incorporated by reference herein in its entirety.

What is claimed is:

1. A method of a terminal apparatus, the method comprising:

receiving notification information including message information indicating a message to be notified to a user and specific information including a plurality of characters and symbols;

displaying, in a case where the notification information is received in a state where a predetermined program included in the terminal apparatus is not operating in a foreground, a first notification region including a message that is based on the message information and not including information that is based on the specific information, on a display unit in a state where the predetermined program is not operating in the foreground;

operating the predetermined program in the foreground in a case where a first operation is performed after the first notification region is displayed in a state where the predetermined program is not operating in the foreground;

displaying a second notification region including a message that is based on the message information and information that is based on the specific information, on the display unit in a state where the predetermined program is operating in the foreground; and executing, in a case where a second operation is performed after the second notification region is displayed, processing that is based on the specific information, wherein the state where the predetermined program is not operating in the foreground is a state where the predetermined program is operating in a background.

2. The method according to claim 1, wherein the specific information is a uniform resource locator (URL) indicating an address of a predetermined resource, and wherein the processing that is based on the specific information is processing of using the predetermined resource.

3. The method according to claim 2, wherein the predetermined resource is a web page, and wherein the processing that is based on the specific information is processing of displaying the web page.

4. The method according to claim 3, wherein the message information is information for notifying a message regarding a communication apparatus, and wherein the processing that is based on the specific information is processing of displaying the web page regarding the communication apparatus.

5. The method according to claim 4, wherein, in a case where the message information is information for notifying an error that has occurred in the communication apparatus, the processing that is based on the specific information is processing of displaying the web page regarding a solving method of the error that has occurred in the communication apparatus.

6. The method according to claim 4, wherein the communication apparatus is a printing apparatus configured to execute printing using recording material, and wherein, in a case where the message information is information for notifying that an amount of the recording material held by the communication apparatus is a predetermined amount or less, the processing that is based on the specific information is processing of displaying the web page for purchasing the recording material.

7. The method according to claim 4, wherein, in a case where the message information is information for notifying a message regarding progress of processing executed by the communication apparatus, the specific information is not included in the notification information, and wherein, in a case where the specific information is not included in the notification information, information that is based on the specific information is not included in the second notification region.

8. The method according to claim 2, wherein the predetermined resource is a different program other than the predetermined program, and wherein the processing that is based on the specific information is processing of activating the different program.

9. The method according to claim 1, wherein the specific information is position information, and wherein the processing that is based on the specific information is processing of presenting a position that is based on the position information.

10. The method according to claim 1, wherein the information that is based on the specific information is a button for receiving an execution instruction of the processing that is based on the specific information, and wherein the second operation is an operation on the button.

11. The method according to claim 1, wherein at least a part of the plurality of characters and symbols is not displayed in the second notification region.

12. The method according to claim 1, wherein the first notification region is displayed on the display unit by a push notification function included in an operating system of the terminal apparatus.

13. The method according to claim 1, further comprising displaying a list indicating a plurality of pieces of the received notification information, on the display unit, in a state where the predetermined program is operating in the foreground.

14. The method according to claim 13, wherein the list includes a message that is based on the message information and does not include information that is based on the specific information.

15. The method according to claim 13, wherein, in a case where any of the plurality of pieces of notification information indicated by the list is selected, the second notification region regarding the selected notification information is displayed on the display unit in a state where the predetermined program is operating in the foreground.

16. The method according to claim 1, further comprising receiving an operation for executing a predetermined setting regarding display of the received notification information is included, wherein, in a state where the predetermined setting is not being executed, control is performed such that the first notification region regarding the notification information including predetermined content is not displayed on the display unit and the first notification region regarding the notification information including content other than the predetermined content is displayed on the display unit, and wherein, in a state where the predetermined setting is being executed, control is performed such that both the first notification region regarding the notification information including the predetermined content and the first notification region regarding the notification information including content other than the predetermined content are displayed on the display unit.

17. The method according to claim 16, wherein a plurality of pieces of the notification information indicated by a list indicating a plurality of pieces of the received notification information includes the notification information including the predetermined content.

18. The method according to claim 1, further comprising transmitting a print job for causing a printing apparatus to execute printing.

19. A method of a terminal apparatus, the method comprising:

receiving notification information including message information indicating a message to be notified to a user and specific information including a plurality of characters and symbols;

displaying, in a case where the notification information is received in a state where a predetermined program included in the terminal apparatus is not operating in a foreground, a first notification region including a message that is based on the message information and not including information that is based on the specific information, on a display unit in a state where the predetermined program is not operating in the foreground;

operating the predetermined program in the foreground in a case where a first operation is performed after the first notification region is displayed in a state where the predetermined program is not operating in the foreground;

displaying a second notification region including a message that is based on the message information and information that is based on the specific information, on the display unit in a state where the predetermined program is operating in the foreground; and executing, in a case where a second operation is performed after the second notification region is displayed, processing that is based on the specific information, wherein at least a part of the plurality of characters and symbols is not displayed in the second notification region.

20. A method of a terminal apparatus, the method comprising:

receiving notification information including message information indicating a message to be notified to a user and specific information including a plurality of characters and symbols;

displaying, in a case where the notification information is received in a state where a predetermined program included in the terminal apparatus is not operating in a foreground, a first notification region including a message that is based on the message information and not including information that is based on the specific information, on a display unit in a state where the predetermined program is not operating in the foreground;

operating the predetermined program in the foreground in a case where a first operation is performed after the first notification region is displayed in a state where the predetermined program is not operating in the foreground;

displaying a second notification region including a message that is based on the message information and information that is based on the specific information, on the display unit in a state where the predetermined program is operating in the foreground; and executing, in a case where a second operation is performed after the second notification region is displayed, processing that is based on the specific information, wherein the first notification region is displayed on the display unit by a push notification function included in an operating system of the terminal apparatus.

* * * * *